United States Patent [19]

Hasan

[11] Patent Number: 4,757,661

[45] Date of Patent: Jul. 19, 1988

[54] WASHER WITH AXIAL RIBS

[75] Inventor: Riaz Hasan, Palatine, Ill.

[73] Assignee: Illinois Tool Works, Inc., Chicago, Ill.

[21] Appl. No.: 14,878

[22] Filed: Feb. 17, 1987

Related U.S. Application Data

[63] Continuation-in-part of Ser. No. 840,152, Mar. 17, 1986, Pat. No. 4,663,910.

[51] Int. Cl.$^4$ .............................. E04D 3/36; F16J 15/10
[52] U.S. Cl. ...................................... 52/410; 411/533; 52/512
[58] Field of Search .................... 52/410, 512; 411/533

[56] References Cited

U.S. PATENT DOCUMENTS

| | | | |
|---|---|---|---|
| 4,074,501 | 2/1978 | Sandquist | 52/410 |
| 4,380,413 | 4/1983 | Dewey | 411/161 |
| 4,630,984 | 12/1986 | Reinwall et al. | 411/533 X |
| 4,663,910 | 5/1987 | Hasan | 52/410 |

Primary Examiner—J. Karl Bell
Attorney, Agent, or Firm—D. I. Roche; T. W. Buckman

[57] ABSTRACT

A washer for attaching insulation to a roof member over which roofing membrane is to be placed. The washer includes a laterally extending apertured flange and an upstanding hollow cylindrical protrusion adapted to snappingly engage the head of a fastener used with the washer. The protrusion has an inwardly extending lip on the inside surface of the free end of the protrusion. In an alternative embodiment sloping ribs guide a fastener head into snapping engagement with an inwardly projecting lip. In all embodiments a resilient rib is disposed on a shoulder formed in the aperture in the washer. The rib resiliently urges the head of the fastener into engagement with the lip. The washer includes a downwardly extending hub, which may be equipped with means for retaining the washer in a batten strip.

7 Claims, 3 Drawing Sheets

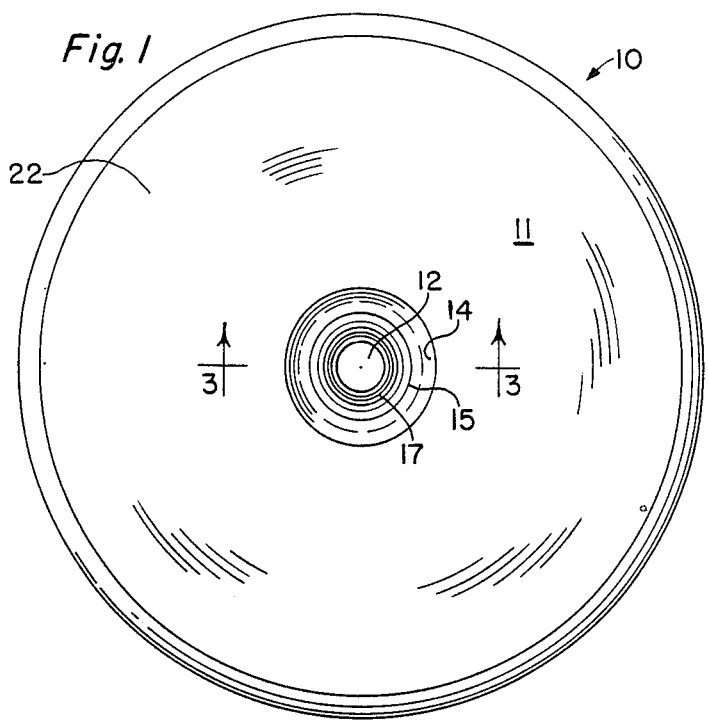
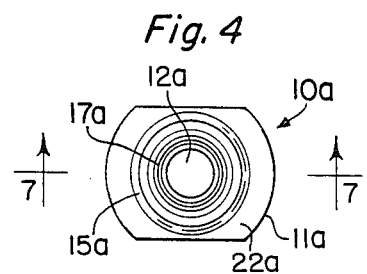
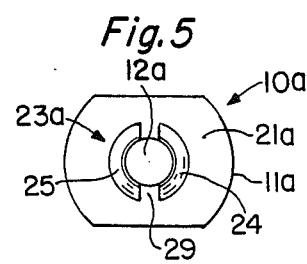
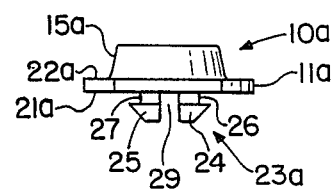
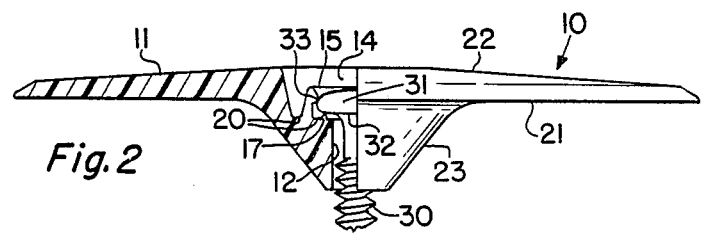
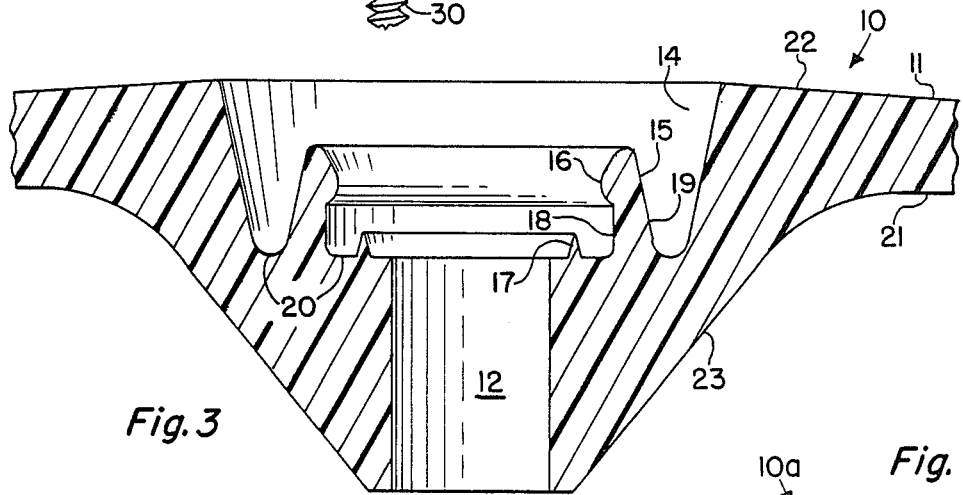
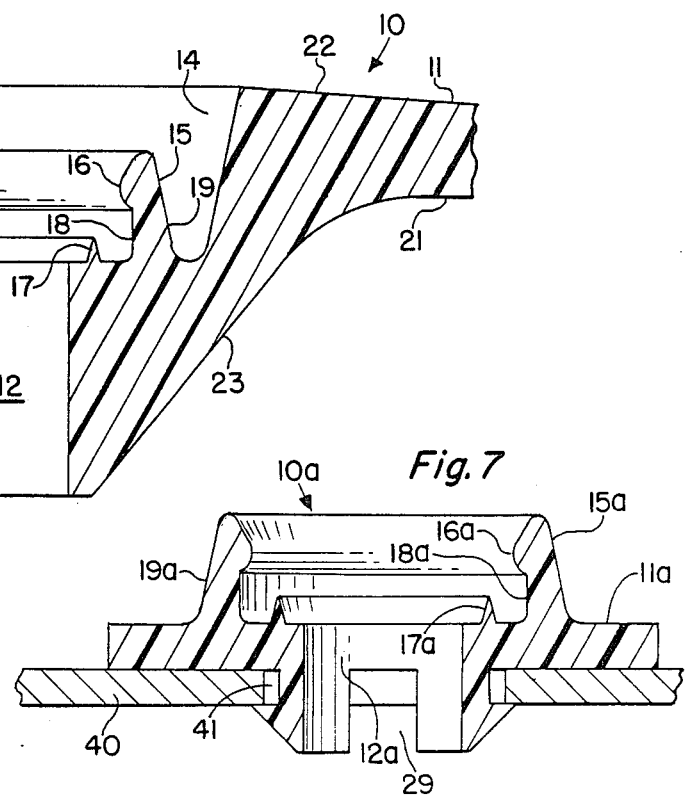

WASHER WITH AXIAL RIBS

This is a continuation-in-part of application Ser. No. 840,152 filed Mar. 17, 1986, now U.S. Pat. No. 4,663,910.

BACKGROUND OF THE INVENTION

The present invention relates to a washer used to attach roofing insulation. The washer of the present invention is particularly useful in construction where single ply roofing membranes are placed over the insulation.

The problem addressed by the present invention involves the puncture of membrane material by fastener heads. This problem arises when screws which are used to secure washers and insulation to a roof substructure become loose and move upward out of their installed positions. Such upward movement is usually attributable to vibration of some sort.

Attempts to eliminate this problem have taken several forms. For example, U.S. Pat. No. 4,361,997 to DeCaro shows engagement between the threads of a screw and the walls of a bore in a washer. Another attempt is the Tap Deck-SP fastener in which an annular ring on the shank of a fastener snaps through the aperture in a washer. A third attempt is shown in FIG. 3 of U.S. Pat. No. 4,074,501 to Sandquist. Sandquist shows a groove formed in a beveled bore. The edges of a countersunk screw head fit into the groove, and tend to prohibit backward motion of the screw.

U.S. Pat. No. 4,380,413 to George G. Dewey, which is owned by the assignee of the present invention, shows a screw and washer combination in which the head of a screw is loosely captivated within a recess in the washer.

It is an object of the present invention to provide a roofing insulation washer which prevents backward motion of a screw during vibration.

Another object of the invention is to provide a washer with means to easily and positively engage the head of a fastener used therewith.

Another object of the present invention is to provide a washer with means for firmly and resiliently gripping the head of a fastener used therewith.

Another object of the invention is to provide a washer in which engagement between the washer and the head of a fastener is easily obtained.

SUMMARY OF THE INVENTION

These and other objects of the invention are obtained with an apertured washer having a generally flat laterally extending flange, at least one axially extending somewhat cylindrical gripping protrusion formed around an aperture in the washer. The protrusion is somewhat cylindrical, and is disposed within a recess in the upper surface of the washer. A radially inwardly extending lip is disposed on the inner portion of the free end of the gripping protrusion. In an alternative embodiment, a series of axial ribs guide the head of a fastener into engagement with a radially inwardly extending lip, which is formed at one end of the series of axial ribs. In all embodiments, a small resilient annular rib is disposed between the aperture and the gripping protrusion. The annular rib urges the fastener head against the lip.

BRIEF DESCRIPTION OF THE DRAWINGS

Other features and advantages of the invention will become apparent from the following specifications read with reference to the following drawings.

FIG. 1 is a top plan view of a washer embodying the present invention.

FIG. 2 is a side elevational view in partial section of the washer shown in FIG. 1.

FIG. 3 is a transverse sectional view of the washer taken along lines 3—3 of FIG. 1.

FIG. 4 is a top plan view of another embodiment of the present invention.

FIG. 5 is a bottom plan view of the embodiment shown in FIG. 4.

FIG. 6 is a side elevational view of the embodiment shown in FIGS. 4 and 5.

FIG. 7 is a transverse cross-sectional view taken along lines 7—7 of FIG. 4.

DETAILED DESCRIPTION OF THE INVENTION

Figure 8:
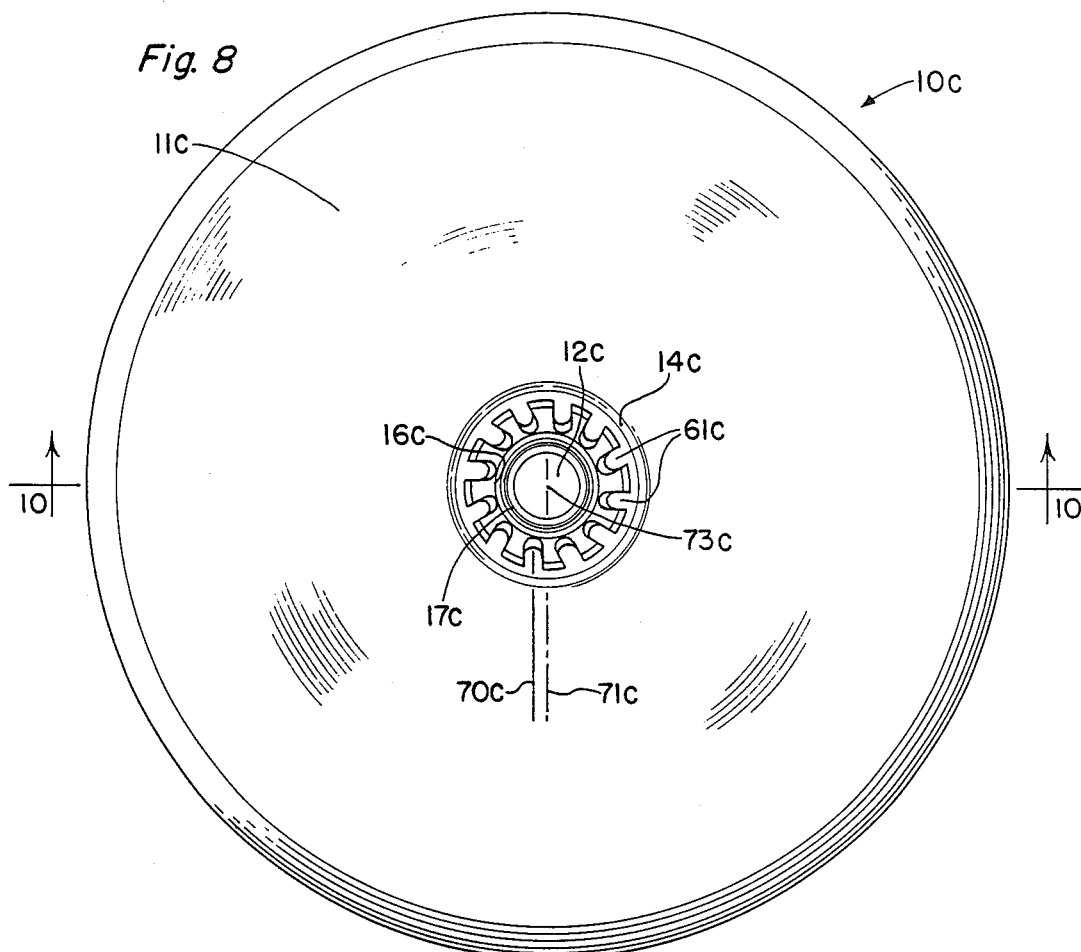
FIG. 8 is a plan view of the top of a third embodiment of the present invention.

FIGS. 1, 2 and 3 show an embodiment of the invention in which the washer 10 is comprised of a laterally extending flange 11 having a central aperture 12 and a protruding hub 23. A recess 14 is formed in the upper side 22 of the flange 11. Within the recess 14 there is a cylindrical protrusion or boss 15 which extends in an axial direction upwardly from a shoulder 20. The boss 15 is spaced laterally from the aperture 12. Between the boss 15 and the aperture 12 there is a small axially extending protrusion in the form of a rib 17. An overhanging lip 16 is formed on the inner free end of the boss 15.

As shown in FIG. 2, a screw 30 has a head 31 which is gripped by the rib 17 and the boss 15. The rib 17 is a resilient tapering rib which engages the underside 32 of the screw head. At the same time, the lip 16 engages the peripheral edge 33 of the top side of the screw head.

The details of the shape of the boss 15 are important. The upper portion of the lip 16 is sloped to act as a guide for the screw head 31. The inner wall 18 of the boss 15 is generally parallel to the axis of the aperture 12, while the outside wall 19 of the boss 15 is sloped inwardly from bottom to top. By placing the boss 15 in the recess 14, two benefits are obtained. First, the upper end of the boss 15 has a space into which it may deflect during the movement of the screw head 31 passed the lip 16. It has been found that the shape as shown in FIG. 3 allows lateral deflection of the boss 15 without resultant damage thereto. Also, because the boss 15 is positioned well below the surface 22 on the upper side of the washer, if a screw head fails to snap pass the lip 16, it will not interfere with a membrane draped over the washer. Vibrations resulting from wind or from sources within a structure can cause loosening and backward motion of roofing screws. The present invention minimizes the possibility of a screw backing up to a point where the screw head 31 projects above the upper surface 22 of the washer.

FIGS. 4–7 show an alternative embodiment of the present invention. In FIGS. 4–7 the designation "a" following a reference numeral is used to designate elements which correspond to the embodiment shown in FIGS. 1–3.

The embodiment of FIGS. 4–7 is intended to be used with a batten strip, as shown in FIG. 7. Batten strips are used to attach edges of roofing membranes. The strips are then covered with a membrane sheet which is adhesively attached to a section of underlying membrane adjacent to the batten strip. Thus, the problem of screw heads tending to loosen and puncture overlying membrane sheets is present with the use of batten strips in a manner similar to the problem associated with insulation fastening as discussed above.

The embodiment of FIGS. 4–7 is similar to the embodiment of FIGS. 1–3 in that the washer 10a includes a laterally extending flange 11a and an axially extending cylindrical protrusion of boss 15a surrounds an aperture 12a extending through the washer. The washer further includes a hub 23a depending from the bottom side of the washer. However, the hub has two legs 24 and 25 which are separated by a slot 29. The legs 24 and 25 have a circumferential notch 26 formed on the outside surface thereof. The notch 26 forms a shoulder 27 which engages a batten strip 40 as the washer is inserted through an aperture 41 in the batten strip.

The cooperation between the boss 15a and a screw head is substantially the same as the cooperation described with reference to the boss 15 and the screw 30 shown in FIG. 2 and discussed above.

Figure 9:
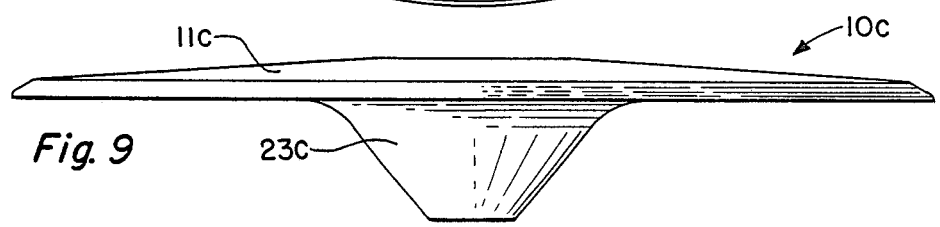
FIG. 9 is a side elevational view of the washer shown in FIG. 8.
Figure 10:
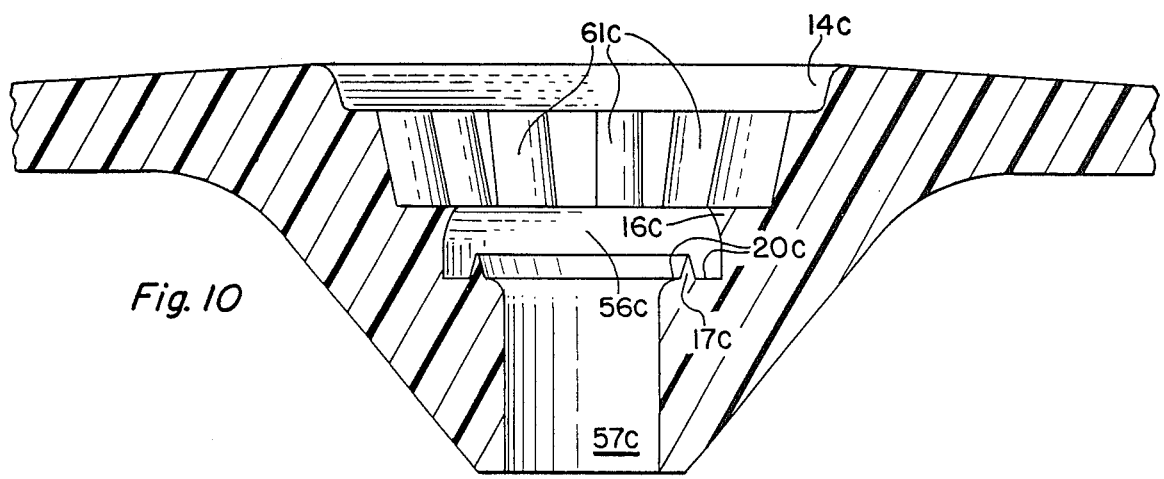
FIG. 10 is an enlarged sectional view of the third embodiment of a washer of the present invention taken along line 10—10 of FIG. 8.
Figure 11:
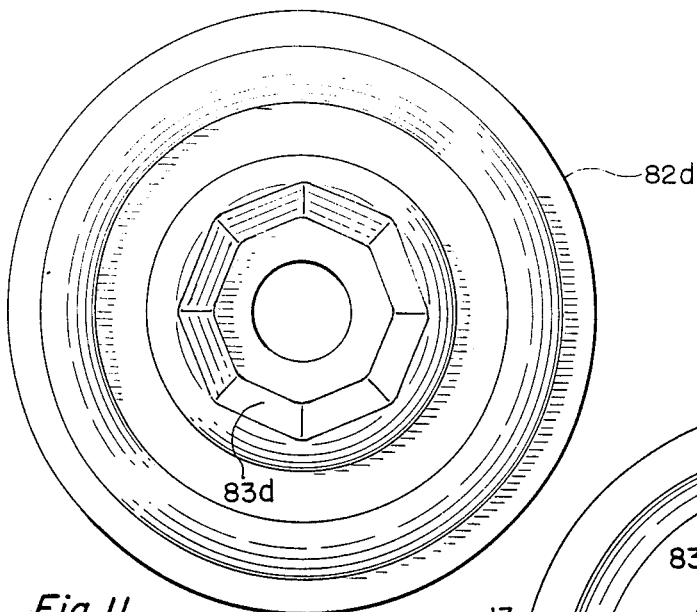
FIG. 11 is a plan view of the top of a fourth embodiment of a washer of the present invention.

FIGS. 8, 9 and 10 show a third embodiment of the invention for which the designation "C" is used following reference numbers. The third embodiment is a washer designated generally with the reference number 10c. It includes a wide laterally extending flange 11a, and a central throughbore 12c. FIG. 8 is a plan view of the upper surface of the flange 11c. FIG. 9 shows a hub 23c depending from the bottom surface of the washer.

FIG. 10 is an enlarged view of a cross-section through the throughbore of the washer 10c. A shoulder 20c divides the throughbore into an upper portion 56c and a lower portion 57c is substantially less than the maximum latter dimension of any part of the upper portion 56c. The upper portion includes a shallow recess 14c in the extreme upper surface of the washer. Below the shallow recess 14c a series of axially extending spirally disposed ribs 61c. The spiral configuration of the series of ribs can best be seen in FIG. 8. The innermost edges of each of the ribs 61c is tapered such that the edges of the ribs form portions of a truncated cone having a wider opening at its upper end and a narrower opening at its lower end.

At the lower end of the series of ribs 61c there is an annular radially inwardly extending lip 16c, which operates in a manner similar to the lip 16 of the embodiment described earlier. The lip 16c cooperates with the rib 17c, which is disposed on the shoulder 20c, to resiliently retain the head of a fastener. The rib 17c deflects an amount sufficient to allow the head of a fastener to snap past the lip 16c, and rib 17c is resilient so that it can push the head of a fastener into gripping engagement with the lip 16c.

The spiral disposition of the ribs 61c is such that retrograde or upward motion of a threaded fastener is severly restricted. However, the insertion of a threaded fastener in a clockwise direction is facilitated by the orientation of the ribs as shown in FIG. 8. Specifically, a plane 70c which bisects a rib 61c is offset from a plane 71c which is parallel to claim 70c and which bisects the central axis 73c of the washer. It has been found that the offset between planes 70c and 71c should be approximately 0.05 inches when the ribs are shaped in a manner similar to those shown in FIG. 8.

FIGS. 11, 12, 13 and 14 show a fourth embodiment of the present invention for which a designation 'd' is added to the reference numbers. This fourth embodiment, generally designated as washer 80d, combines elements of the embodiment of the FIGS. 4–7 and FIGS. 8–10. The washer 10d is comprised of two components, a central body 81d made of generally resilient material and a flange 82d carried by a central body 81d. The flange 82d contains an octagonal impression 83d formed therein. A mating octagonal configuration is formed on the under surface of the central body 81d to prevent relative rotation of the two components. As with the third embodiment shown in FIGS. 8, 9 and 10, the washer 10d is equipped with ribs 61d which are similar in shape and function to the ribs 61c described earlier, and lip 16d cooperates with rib 17d in substantially the same way in which lip 16c cooperates with rib 17c.

Figure 12:
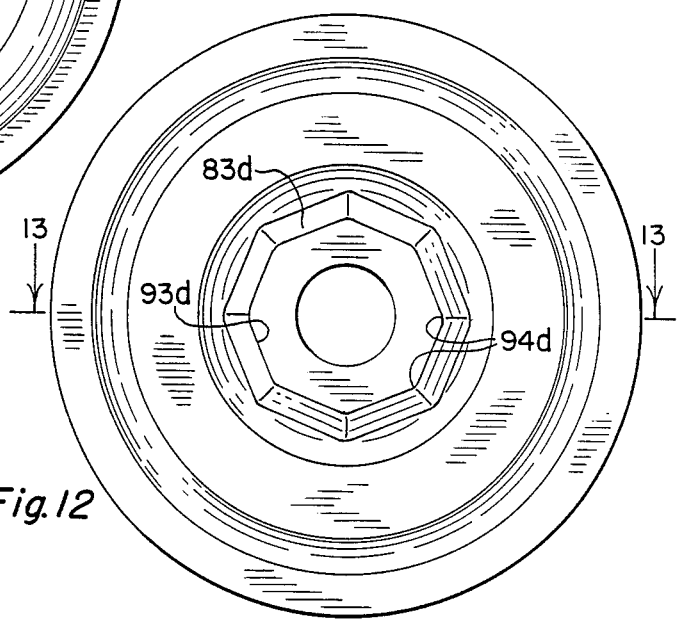
FIG. 12 is a plan view of the bottom of the washer shown in FIG. 11.
Figure 13:
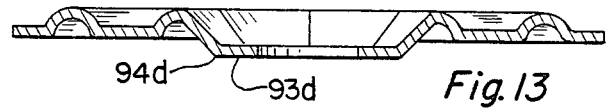
FIG. 13 is a sectional view taken along line 13—13 in FIG. 11.
Figure 14:
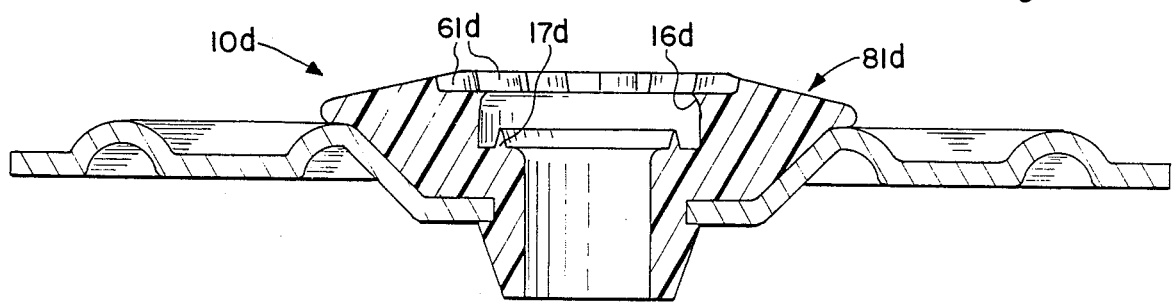
FIG. 14 is a sectional view of the washer shown in FIGS. 11 through 13 in combination with a screw head retaining insert.

It should be noted that the undersurface of the flange 82d, shown in FIG. 12, includes edges 93d and corners 94d formed by the octagonal impression 83d in the upper surface of the flange 82d. The edges 93d and corners 94d project slightly below the outer clamping surfaces 95d. This enables the edges 93d and corners 94d to engage a roofing membrane and prevent lateral movement of that membrane. If substantial movement of the membrane occurs at the location of the edges 93d and corners 94d, stress concentration can occur at points of contact between the membrane and a threaded fastener, which can cause early failure of the membrane.

Another advantage of the third and fourth embodiments of the present invention is in the ability of the ribs 61c and 61d to melt. In some roofing application, lapping of adjacent membranes and heat sealing thereof causes roofing insulation washers, like those of the present invention, to be exposed to high temperatures. When washers like those of the third and fourth embodiment of the present invention are exposed to high temperature, the ribs 61c and 61d melt easily because of their large surface area. When the ribs melt, the material comprising them flows over the head of the fastener and further prevents rotation and backing out of the fastener.

While specific embodiments of the invention have been described in detail above, variations and modifications will become apparent to those skilled in the art. Such variations and modifications are intended to fall within the spirit and scope of the appendant claims.

We claim:

1. A washer for use in attaching insulation to a roof member with a fastener having a head and an elongated shank, said washer comprising a resilient non-metallic body having a central throughbore, a shoulder formed in said throughbore for engaging the head of a fastener, said shoulder defining and separating upper and lower portions of said throughbore, said upper portion having a maximum lateral dimension greater than that of said lower portion, restraining means formed in said upper portion for engaging a portion of said fastener head and for restricting axial movement thereof, guide means formed in walls of said throughbore in said upper portion, said guide means comprising a series of axially disposed ribs merging with said restraining means, said ribs providing reinforcement to said restraining means against upward movement of said fastener out of said upper portion of said throughbore.

2. A washer in accordance with claim 1 wherein innermost edges of said ribs form portions of a truncated cone, said cone being larger at its upper end than at its lower end.

3. A washer in accordance with claim 1 wherein said ribs are disposed in a generally spiral configuration around said throughbore, said spiral configuration being in a generally clockwise direction as viewed in a plan view of the upper surface of said washer.

4. A washer in accordance with claim 1 wherein said ribs are disposed around said throughbore in a spiral configuration which facilitates the deflection of said ribs in one circumferential direction and restricts deflection of said ribs in an opposite circumferential direction.

5. A washer in accordance with claim 1 wherein each of said ribs has a bisecting axial plane which is offset from a corresponding parallel radial plane which intersects the central axis of said washer and throughbore.

6. A washer in accordance with claim 5 wherein said bisecting plane is offset by approximately 0.05 inches from said corresponding parallel radial plane.

7. A washer in accordance with claim 5 wherein said bisecting plane is offset relative to said parallel plane in a clockwise direction, when viewed in a plan view of the upper surface of said washer.

* * * * *

UNITED STATES PATENT AND TRADEMARK OFFICE
CERTIFICATE OF CORRECTION

PATENT NO. : 4,757,661
DATED : July 19, 1988
INVENTOR(S) : Louis Thomas et al

It is certified that error appears in the above-identified patent and that said Letters Patent is hereby corrected as shown below:

On the title page inventors should read

--(75) Inventors: Louis Thomas, Maywood, ILL;

Riaz Hasan, Palatine, ILL.--.

Title page, Item (19), "Hasan" should read --Thomas et al--.

Signed and Sealed this

Ninth Day of May, 1989

Attest:

DONALD J. QUIGG

*Attesting Officer*   *Commissioner of Patents and Trademarks*